United States Patent Office 3,534,141
Patented Oct. 13, 1970

3,534,141
BICYCLIC-SUBSTITUTED UREAS AND THEIR INSECT- AND MITE-REPELLENT COMPOSITIONS AND METHODS OF USE
Gerhard Muller, Leverkusen, Wolfgang Behrenz, Cologne-Stammheim, and Rudolf Hiltmann and Hartmund Wollweber, Wuppertal-Elberfeld, Germany, assignors to Farbenfabriken Bayer Aktiengesellschaft, Leverkusen, Germany, a corporation of Germany
No Drawing. Filed July 18, 1966, Ser. No. 565,747
Claims priority, application Germany, July 22, 1965,
F 46,675
Int. Cl. A01n 9/20
U.S. Cl. 424—322                   15 Claims

ABSTRACT OF THE DISCLOSURE

N-[optionally mono to tri -chloro and/or -methyl substituted)-bicyclo-[2,2,1]-alkyl]-N-(optionally alkyl)-N'-(optionally alkyl or alkoxy)-N'-alkyl-ureas, some of which are known and which possess pest-repellent, i.e. arthropod-repellent, e.g. insect- and mite-repellent properties, and which may be produced by conventional methods.

---

The present invention relates to particular bicyclic-substituted ureas, most of which are known and which surprisingly possess strong pest-repellent, especially insect- and mite-repellent, properties, to their compositions with dispersible carrier vehicles, and to methods for the production and use thereof for pest-repellent purposes.

It is already known that dimethyl phthalate (A) and, in particular, m-toluic-N,N-diethylamide (B), can be used as insect repellents. These compounds have already attained a substantial significance in practice although they possess a repellent activity which only lasts for several hours.

It is an object of the present invention to provide certain particular bicyclic-substituted ureas which possess valuable pest-repellent, and especially arthropod-repellent such as insect-repellent and mite-repellent, properties; to provide active compositions of certain particular bicyclic-substituted ureas, most of which are known, in the form of mixtures of such compounds with dispersible liquid and solid carrier vehicles; and to provide methods of using such compounds in a new way, especially for repelling pests, such as arthropods, and the like.

Other and further objects of the present invention will become apparent from a study of the within specification and accompanying examples.

It has now been found in accordance with the present invention that the particular bicyclic-substituted ureas, most of which are known, having the formula:

$$(R)_m\text{-}\underset{\underset{CH}{|}}{\overset{\overset{CH}{|}}{\underset{CH_2}{\overset{CH_2}{|}}\underset{CH_2}{\overset{CH_2}{|}}}}\text{-}(CH_2)_p\text{-}\underset{\underset{CH}{|}}{\overset{\overset{CH}{|}}{\underset{CH_2}{\overset{CH_2}{|}}\underset{CH_2}{\overset{CH_2}{|}}}}\text{-}C_nH_{2n}\text{-}N(R')\text{-}CO\text{-}N(R'')(R''')\quad (I)$$

in which R is selected from the group consisting of hydrogen, chlorine and methyl, $m$ is a number from 1 to 3, $p$ is a number from 1 to 2, $n$ is a number from 0 to 2, R' is selected from the group consisting of hydrogen and alkyl having 1 to 4 carbon atoms, R'' is selected from the group consisting of hydrogen, alkyl having 1 to 4 carbon atoms, and alkoxy having 1 to 3 carbon atoms, and R''' is alkyl having 1 to 4 carbon atoms, possess strong pest-repellent, and especially insect- and mite-repellent, properties.

In accordance with an advantageous feature of the present invention, pest-repellent, especially insect- and mite-repellent, compositions are provided which contain, as active ingredient, a compound of Formula I in admixture with a solid diluent or carrier or in admixture with a liquid diluent or carrier containing a surface-active agent.

It is very surprising that the particular active compounds usable according to the present invention, alone or in the form of mixtures with dispersible carrier vehicles as noted above, have a substantially higher repellent action against pests, such as insects and mites, than previously known insect-repellent compounds. The particular active compounds usable according to the present invention thus represent a valuable addition to the art.

Examples of ureas of Formula I, thus usable in accordance with the present invention, include the following:

N - [1,7,7 - trimethyl - bicyclo - (2,2,1) - hept - 2 - yl]-N'-methoxy-N'-methyl-urea:

(IIa)

B.P. 100–102° C./0.4 mm. Hg.

N - [1,7,7 - trimethyl - bicyclo - (2,2,1) - hept - 2 - yl]-N'-ethoxy-N'-ethyl-urea:

(IIIa)

B.P. 112–114° C./0.4 mm. Hg.

N - [1,3,3 - trimethyl - bicyclo - (2,2,1) - hept - 2 - yl]-N'-methoxy-N'-methyl-urea:

(IVa)

B.P. 100–102° C./0.5 mm. Hg.

N - [1,3,3 - trimethyl - bicyclo - (2,2,1) - hept - 2 - yl]-N'-ethoxy-N'-ethyl-urea:

(Va)

B.P. 108–110° C./0.4 mm. Hg.

N - [2,3,3 - trimethyl - bicyclo - (2,2,1)-hept-2-yl]-N'-methoxy-N'-methyl-urea:

(VIa)

B.P. 108–112° C./0.4 mm. Hg.

N-[2,3,3-trimethyl - bicyclo-(2,2,1)-hept-2-yl]-N'-ethoxy-N'-ethyl-urea:

(VIIa)

B.P. 120–122° C./0.4 mm. Hg.

N-[(bicyclo-[2,2,2] - oct - 2 - yl)-methyl]-N'-methoxy-N'-methyl-urea:

(VIIIa)
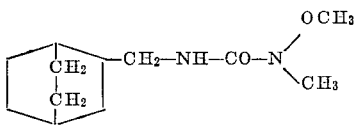

M.P. 54–55° C.

N - [1,3,3 - trimethyl-bicyclo-(2,2,1)-hept-2-yl]-N',N'-dimethyl-urea:

(IXa)
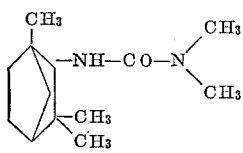

M.P. 115–117° C.

N-[1,7,7 - trimethyl - bicyclo-(2,2,1)-hept-2-yl]-N',N'-diethyl-urea:

(Xa)
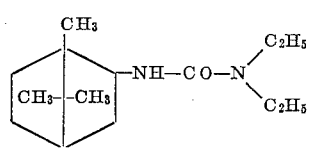

M.P. 88° C.

N-[1,7,7 - trimethyl - bicyclo-(2,2,1)-hept-2-yl]-N',N'-di-n-propyl-urea:

(XIa)
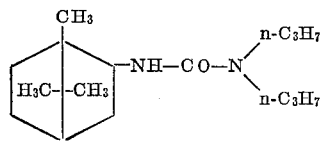

M.P. 66° C.

N-[1,7,7 - trimethyl - bicyclo-(2,2,1)-hept-2-yl]-N',N'-di-n-butyl-urea:

(XIIa)
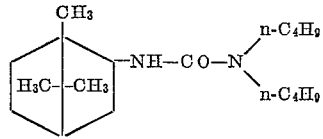

M.P. 88° C.

N-[2-(bicyclo - [2,2,1] - hept - 2' - yl)-eth-1-yl]-N',N'-dimethyl-urea:

(XIIIa)
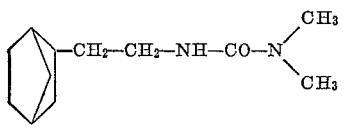

M.P. 74–75° C.

N-[1-(bicyclo - [2,2,1] - hept - 2' - yl)-eth-1-yl]-N',N'-dimethyl-urea:

(XIVa)
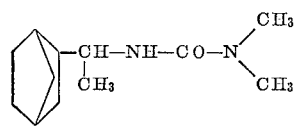

M.P. 103–104° C.

Some of the compounds of Formula I above are known, yet not known for the instant purposes, of course. Such compounds can be prepared by numerous known processes (cf. German Pat. 1,081,453).

Thus, these compounds can be produced:

(1) By reacting bicyclically-substituted isocyanates, carbamic acid chlorides, or carbamic acid esters with amines, or (2) By reacting bicyclically-substituted amines with carbamic acid chlorides, or isocyanates.

Of the bicyclically-substituted amines which may be used for the reaction, and which can readily be obtained, for example, from diene addition products and some also from natural materials, the following may be mentioned, by way of example: 2-bicyclo-[2,2,1]-heptylamine; 2-bicycle-[2,2,1]-heptyl-methylamine; 1- and 2-(2-bicyclo-[2,2,1]-heptyl)-ethylamine; fenchylamine; bornylamine; isobornylamine; 2-amino-isocamphane; N-methyl-bornylamine, and (2-methyl-bicyclo-[2,2,1]-heptyl-2)-methylamine. Furthermore, as bicyclically-substituted amine, there can be used the amine obtained by catalytic hydrogenation of abietic acid nitrile.

Bicyclically-substituted isocyanates which may be used for the preparation of the instant compounds can be prepared from the corresponding primary amines in known manner (cf. German Pat. 1,081,453) by phosgenation or by diene synthesis (cf. German Pat. 1,156,793).

Bicyclically-substituted carbamic acid esters which are usable for the preparation of the instant compounds are produced from the appropriate amines by reaction with chloroformic acid esters, or in individual cases, by the addition of carbamic acid esters to olefins (cf. German Pat. 1,157,598). Examples of amines include methylamine, dimethylamine, methylethylamine, diethylamine, isopropylamine, n-butylamine, isobutylamine, tert.-butylamine, di-n-butylamine, methylbutylamine, di-n-propylamine, diisobutylamine, N,O-dimethylhydroxylamine and N,O-diethyl-hydroxylamine.

The carbamic acid chlorides usable for the reaction with the bicyclically-substituted amines to produce the instant compounds are derived from the above simple amines and may be prepared from these, for example by the reaction with phosgene.

The reaction of the bicyclically-substituted isocyanates with the amines may be carried out in the absence or in the presence of diluents, such as water, alcohols, esters, ketones or aromatic hydrocarbons. Tertiary amines, such as trimethylamine, may be added to accelerate the reaction. The reaction temperatures in question may be varied within a fairly wide range. In general, the reaction takes place at temperatures substantially between about 0 and 150° C.

The reaction is carried out in the conventional manner, for example, with the use of equimolar amounts of the reaction components or with the use of an excess of the amine, which can be obtained in a technically simple way.

When carbamic acid chlorides are reacted with amines, it is advantageous to add solvents, such as aromatic hydrocarbons, ethers, ketones or esters, and also acid binding agents, such as triethylamine, pyridine, sodium carbonate, or sodium hydroxide. The reaction temperatures substantially are between about 0 and 100° C. when using this method.

When bicyclically-substituted carbamic acid esters are reacted with amines, the operation is expediently carried out in solvents, such as alcohols, ethers or aromatic hydrocarbons. The reaction temperatures may be varied within a fairly wide range. In general, the process is carried out at temperatures substantially between about 100 and 250° C., preferably between about 150 and 230° C. Equimolar amounts of the reaction components or an excess of the technically readily obtainable amine are used. Basic catalysts, such as sodium carbonate or potassium carbonate, may also be used to accelerate the reaction.

In the following, the production of one of the active compounds usable according to the present invention is described in more detail for the purposes of illustration:

N-ISOBORNYL-N',N'-DIMETHYL-UREA

A solution of 544 g. of camphene in 300 cc. of anhydrous benzene are added dropwise at 70° C., within the course of 8 hours, under a nitrogen atmosphere, to a solution of 430 g. of urethane and 200 cc. of boron trifluoride etherate in 400 cc. of anhydrous benzene. The reaction is continued at 70° C. for a further period of 20 hours; the product is worked up and there are obtained 356 (40%) of ethyl N-isobornyl-carbamate; B.P. 115–116° C./0.12 mm. Hg; $n_D^{20}$ 1.4873.

45 g. of ethyl N-isobornyl-carbamate are dissolved in 150 ml. of dioxan and reacted at 210° C., in an autoclave, with 50 ml. of dimethylamine; the reaction time is 6 hours. The solvent is then removed. 42 g. of crude N-isobornyl-N',N'-dimethyl urea are obtained. This crude product has a viscous consistency but gradually crystallizes. The crystallized product is purified by recrystallization from petroleum ether. Colorless crystals are obtained which melt at 82–87° C.

The crude N-isobornyl-N',N'-dimethyl urea (XVa) can be used as such as repellent active agent.

Significantly, the instant active compounds exhibit a strong repellent action against arthropods and a low toxicity towards warm-blooded animals. The effect lasts a long time. The instant compounds can, therefore, be used, with good results, to repel sucking and biting insect pests and mites.

The sucking insects contemplated herein essentially include mosquitoes, such as the species Aedes, Culex and Anopheles; and flies such as Phlebotomes; biting flies, such as Culicoides species; buffalo gnats, such as the Simulium types; stinging flies, such as the stable fly (*Stomoxys calcitrans*), tsetse flies (Glossina species) and horse flies, such as the Tabanus, Haemotopota and Chrysops species; the common housefly (*Musca domestica*); the lesser housefly (*Fannia canicularis*); meat flies, such as *Sarcophaga carnaris*; flies causing myiasis, such as *Lucilia cuprina, Chrysomyia chloropyga, Hypoderma bovis, Hypoderma lineata, Dermatobia hominis, Oestrus ovis, Gasterophilus intestinalis* and *Cochliomyia hominivorax*; bugs, such as *Cimex lectularius, Rhodnius prolixus* and *Triatoma infestans*; lice, such as *Pediculus humanus, Haematopinus suis* and *Damalinia ovis*; keds, such as *Melophagus ovinus*; fleas, such as the human flea (*Pulex irritans*), *Ctenocephalus cants* and sand fleas, such as *Dermatophilus penetrans*, and the like.

The biting insects essentially include cockroaches, such as the German cockroach (*Blattella germanica*) and the house cockroach (*Blatta orientalis*); beetles, such as the grain weevil (*Sitophilus granarius*), the stag beetle (*Hylotrupes bajulus*), the death watch beetle (*Anobium punctatum*), the bread beetle (*Anobium paniceum*), the bacon beetle (*Dermestes lardarius*) and the mealworm beetle (*Tenebrio molitor*), termites, such as *Reticulitermes lucifugus*; and ants, such as *Lasium niger*, and the like.

The mites contemplated herein include ticks, such as *Ornithodoros moubata, Boophilus microplus* and *Amblyomma hebraeum*, and mites in the stricter sense, such as *Dermanyssus gallinae* and *Sarcoptes scabiei*, and the like.

Thus, the active compounds of the instant invention can be used as pest-repellents either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders dusting agents, granulates, ointments, oils, lacquers, sprays, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), animal and vegetable oil fats (for instance, lanolin, olive oil, nut oils, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, ointments, oils, lacquers, sprays, and granulates which are thus ready for use.

As concerns commercially marketed preparations, these generally contemplate carrier composition mixtures in which the active compound is present in an amount substantially between about 1–95% by weight, and preferably 5–90% by weight of the mixture, whereas carrier composition mixtures suitable for direct application or field application generally contemplate those in which the active compound is present in an amount substantially between about 1 and 80%, preferably 5 and 50%, by weight of the mixture. Thus, the present invention contemplates overall compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 1 and 95% by weight of the mixture.

Furthermore, the present invention contemplates methods of repelling pests, especially insects and acarids, such as mites, which comprise applying to at least one of (a) such pests and (b) their habitat, a pest-repellent, especially insect-repellent and/or acarid-repellent, such as mite-repellent, effective amount of the particular active compound of the invention alone or together with a carrier vehicle, as noted above. The instant formulations or compositions are applied in the usual manner, for example, by spraying, atomizing, vaporizing, scattering, dusting, watering, sprinklng, pouring, rubbing, and the like.

It will be realized in accordance with the present invention that the instant compounds may be used effectively not only in plant protection but also against insects and acarids, specifically for protection against insects and mites.

The following example is given by way of illustration, and not limitation, of the utility of the particular compounds usable according to the present invention:

EXAMPLE

Repellent test/mosquitoes

Test insect: *Aedes aegypti*
Solvent: alcohol.

To produce a suitable preparation of the particular active compound, 5 parts by weight of such active compound are mixed with 100 parts by volume of the solvent.

A patch of hair is shaven off from the backs of guinea pigs to the extent of 50 cm.$^2$. 0.4 cc. of such preparation of the given active compound is uniformly distributed over this shaven area. The animals are then placed in narrow cages of fine wire mesh which leaves free the shaven area of the back of the respective animal. The cages containing the guinea pigs are placed for 10 minutes in larger cages containing several thousand hungry mosquitoes flying about. Of course, while the mesh of the narrow cases containing the guinea pigs is such that the mosquitoes may pass therethrough, the mesh of the larger cages is fine enough to keep the mosquitoes therewithin. The guinea pigs are observed to see whether the mosquitoes bite them on the treated area. The placing of the guinea pig cages into the larger cages is repeated once every hour for a 10-minute period.

For the purposes of the test, the repellent action is regarded as terminated when the guinea pig is bitten by more than one mosquito during the given 10-minute period of observation.

The active compounds, test insects and duration of the repellent effect can be seen from the following table:

TABLE.—REPELLENT TEST/MOSQUITOES

[Test insect: *Aedes aegypti*]

| | Active compound | | Duration of the repellent action in hours |
|---|---|---|---|
| B | N,N-diethyl-m-toluamide (known) | | 14 |
| A | Dimethylphthalate (known) | | 8 |
| XVa′ | 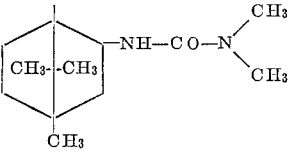<br>N-[1,7,7-trimethyl-bicyclo-(2,2,1)-hept-2-yl]-N′,N′-dimethyl urea isobornyl isomer.<br>(N-isobornyl-N′,N′-dimethyl-urea.) | M.P. 82–87° C. | 43 |
| XVIa | 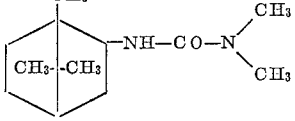<br>N-[1,7,7-trimethyl-bicyclo-(2,2,1)-hept-2-yl]-N′,N′-dimethyl urea bornyl isomer.<br>(N-bornyl-N′,N′-dimethyl-urea.) | M.P. 102° C. | 48 |
| XVIIa | 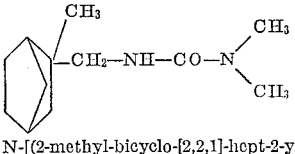<br>N-[(2-methyl-bicyclo-[2,2,1]-hept-2-yl)-methyl]-N′,N′-dimethyl-urea. | M.P. 56–57° C. | 21 |
| XVIIIa | 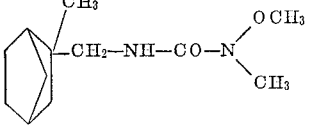<br>N-[(2-methyl-bicyclo-[2,2,1]-hept-2-yl)-methyl]-N′-methoxy-N′-methyl-urea. | B.P. 110–112° C./0.1 mm. Hg. | 25 |
| XIXa | 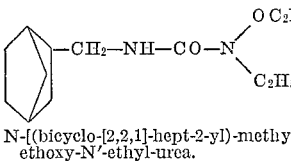<br>N-[(bicyclo-[2,2,1]-hept-2-yl)-methyl]-N′-ethoxy-N′-ethyl-urea. | B.P. 130° C./0.1 mm. Hg. | 31 |
| VIIIa′ | 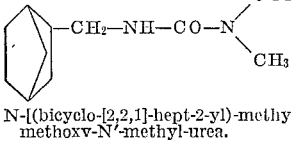<br>N-[(bicyclo-[2,2,1]-hept-2-yl)-methyl]-N′-methoxy-N′-methyl-urea. | B.P. 118° C./0.4 mm. Hg. | 30 |

TABLE.—Continued

| Active compound | | Duration of the repellent action in hours |
|---|---|---|
| XXa 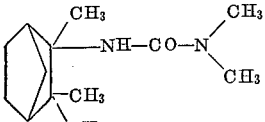 N-[2,3,3-trimethyl-bicyclo-(2,2,1)-hept-2-yl]-N',N'-dimethyl-urea. | B.P. 124–132° C./ 0.4 mm. Hg. | 28 |
| XXIa 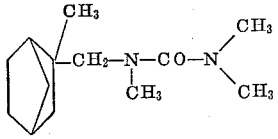 N-[(2-methyl-bicyclo-[2,2,1]-hept-2-yl)-methyl]-N-methyl-N',N'-dimethyl-urea. | B.P. 110° C./0.4 mm. Hg. | 23 |
| XXIIa 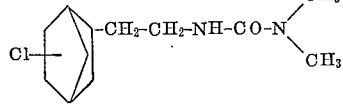 N-[2-(chloro-bicyclo-[2,2,1]-hept-2-yl)-eth-1-yl]-N',N'-dimethyl-urea. | M.P. 55.5–57° C. | 27 |
| XXIIIa 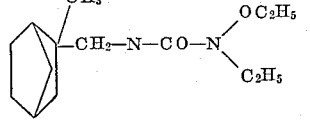 N-[(2-methyl-bicyclo-[2,2,1]-hept-2-yl)-methyl]-N'-ethoxy-N'-ethyl-urea. | B.P. 127–128° C./ 0.1 mm. Hg. | 20 |

In accordance with a particular feature of the present invention, the following compounds are contemplated herein:

Bicyclo-(2,2,1)-alkyl-substituted ureas having the formula:

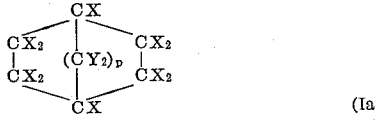

(Ia)

in which one of the symbols X represents the radical:

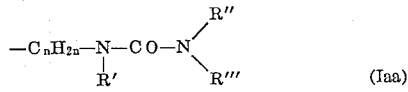

(Iaa)

in which n is a number from 0 to 2, R' is selected from the group consisting of hydrogen and alkyl having 1 to 4 carbon atoms, R" is selected from the group consisting of hydrogen, alkyl having 1 to 4 carbon atoms, and alkoxy having 1 to 3 carbon atoms, and R''' is alkyl having 1 to 4 carbon atoms, and p is a number from 1 to 2, with the proviso that where p is 1 then the remaining 9 symbols X and the 2 symbols Y, each respectively represents a member selected from the group consisting of hydrogen, chlorine, and methyl, with at least 8 and at most 11 of said remaining 9 symbols X and 2 symbols Y being hydrogen, and that where p is 2, then the remaining 9 symbols X and the 4 symbols Y each respectively represents a member selected from the group consisting of hydrogen, chlorine, and methyl, with at least 11 and at most 13 of said remaining 9 symbols X and the 4 symbols Y being hydrogen; and N-[bicyclo-(2,2,1)-hept-2-yl]-ureas having the formula:

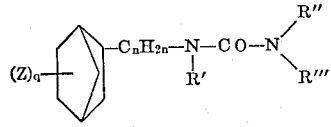

(Ib)

in which n is a number from 0 to 2, R' is selected from the group consisting of hydrogen and alkyl having 1 to 4 carbon atoms, R" is selected from the group consisting of hydrogen, alkyl having 1 to 4 carbon atoms, and alkoxy having 1 to 3 carbon atoms, and R''' is alkyl having 1 to 4 carbon atoms, Z is selected from the group consisting of chlorine and methyl, and q is a number from 0 to 3.

Advantageously, in accordance with the present invention, in the foregoing formulae:

R represents hydrogen, or chlorine, or methyl;
R' represents hydrogen, or alkyl having 1–4 carbon atoms, such as methyl, ethyl, n-propyl, iso-propyl, n-butyl, iso-butyl, sec.-butyl, tert.-butyl, especially methyl;
R" represents hydrogen; or alkyl having 1–4 carbon atoms, such as methyl to tert.-butyl inclusive; or alkoxy having 1–3 carbon atoms, such as methoxy, ethoxy, n-propoxy and iso-propoxy;
R''' represents alkyl having 1–4 carbon atoms, such as methyl to tert.-butyl inclusive;
m is a number from 1 to 3 inclusive;
n is a number from 0 to 2 inclusive; and
p is a number from 1 to 2.

In connection with the foregoing, it will be appreciated that where the group $(R)_m$ is concerned, the same preferably contemplates monochloro, monomethyl, trimethyl, and the like, or, of course, otherwise hydrogen; and that with respect to the designation $C_nH_{2n}$, the same may represent a bond between the ring carbon atom and the adjacent N atom of the urea group where n is 0 or the methylene group where n is 1, or 1,2-ethylene (i.e., dimethylene —CH$_2$—CH$_2$—) or 1,1-ethylene methyl-methylene

where n is 2. Also, in the case of the group $(CH_2)_p$, the same represents an endomethylene (i.e., —CH$_2$—) where p is 1, or endoethylene (i.e., endo-dimethylene

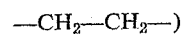

where *p* is 2, either of which endomethylene or endoethylene may be substituted with one or more of said R substituents.

It will be realized by the artisan that all of the foregoing compounds contemplated by the present invention possess the desired pest-repellent, especially insect-repellent and acarid-repellent, including mite-repellent, activity, and extremely low phytotoxicity as regards cultivated plants, as well as extremely low toxicity towards warm-blooded animals.

Advantageously, for protection against blood-sucking insects and mites, the active compounds are applied to human or animal skin, or clothes or other atricles are impregnated with them. To repel pests damaging foodstuffs or materials the substances to be protected are either treated directly with the instant active agents or the latter are applied to an area around the substances to be protected, thus creating inhibition zones against the penetration of the pests.

As contemplated herein, the terms "arthropod" and "arthropod-repellent" may be defined as encompassing specifically both insects and acarids within the contemplation of their meaning, for convenience in determining the collective aspects of utility herein. Thus, the insects and acarids may be considered herein collectively as arthro-invention, and hence the insect-repellent and/or acarid-repellent activity may be termed arthropod-repellent activity, and the concomitant combative or effective amount used in accordance with the invention will be an arthropod-repellent effective amount which in essence means an insect-repellent or acarid-repellent effective amount of the active compound for the desired purpose.

It will be appreciated that the instant specification and examples are set forth by way of illustration and not limitation, and that various modifications and changes may be made without departing from the spirit and scope of the present invention.

What is claimed is:

1. Method of repelling arthropods which comprises applying to at least one of (a) such arthropods and (b) their habitat, a mixture of a dispersible carrier vehicle, selected from the group consisting of (1) a dispersible finely divided solid and (2) a dispersible liquid containing a surface-active agent, and an arthropod-repellent effective amount, substantially between about 1 and 95% by weight of the mixture, of a bicyclic-substituted urea having the formula:

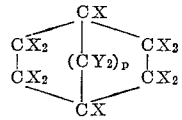

in which one of the symbols X represents the radical:

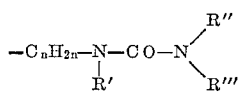

in which *n* is a number from 0 to 2, R' is selected from the group consisting of hydrogen and alkyl having 1 to 4 carbon atoms, R" is selected from the group consisting of hydrogen, alkyl having 1 to 4 carbon atoms, and alkoxy having 1 to 3 carbon atoms, and R''' is alkyl having 1 to 4 carbon atoms, and *p* is a number from 1 to 2, with the proviso that where *p* is 1 then the remaining 9 symbols X and the 2 symbols Y, each respectively, represents a member selected from the group consisting of hydrogen, chlorine, and methyl, with at least 8 and at most 11 of said remaining 9 symbols X and 2 symbols Y being hydrogen, and that where *p* is 2, then the remaining 9 symbols X and the 4 symbols Y, each respectively, represents a member selected from the group consisting of hydrogen, chlorine, and methyl, with at least 11 and at most 13 of said remaining 9 symbols X and the 4 symbols Y being hydrogen.

2. Method according to claim 1 wherein said urea is N-[bicyclo-(2,2,1)-hept-2-yl]-urea having the formula:

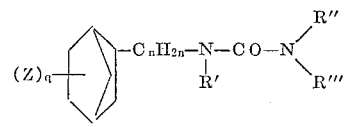

in which *n* is a number from 0 to 2, R' is selected from the group consisting of hydrogen and alkyl having 1 to 4 carbon atoms, R" is selected from the group consisting of hydrogen, alkyl having 1 to 4 carbon atoms, and alkoxy having 1 to 3 carbon atoms, and R''' is alkyl having 1 to 4 carbon atoms, Z is selected from the group consisting of chlorine and methyl, and *q* is a number from 0 to 3.

3. Method according to claim 1 wherein said urea is N-[1,7,7-trimethyl-bicyclo-(2,2,1)-hept-2 - yl] - N',N' - dimethyl-urea isobornyl-isomer having the formula:

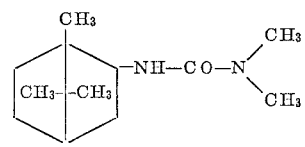

4. Method according to claim 1 wherein said urea is N-[1,7,7-trimethyl-bicyclo-(2,2,1)-hept-2-yl] - N',N' - dimethyl-urea bornyl-isomer having the formula:

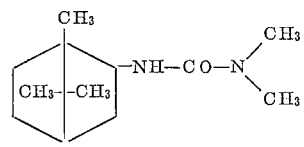

5. Method according to claim 1 wherein said urea is N-[2-methyl-bicyclo-[2,2,1]-hept-2-yl) - methyl] - N',N'-dimethyl-urea having the formula:

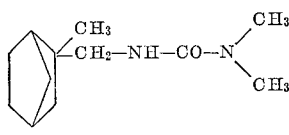

6. Method according to claim 1 wherein said urea is N-[(bicyclo-[2,2,1]-hept-2-yl)-methyl] - N' - ethoxy-N'-ethyl-urea having the formula:

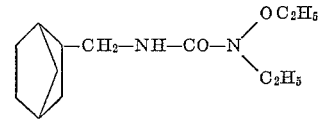

7. Method according to claim 1 wherein said urea is N-[(bicyclo-[2,2,1]-hept-2-yl)-methyl] - N' - methoxy-N'-methyl-urea having the formula:

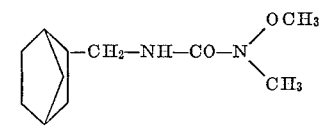

8. Method according to claim 1 wherein said urea is N-[2,3,3-trimethyl-bicyclo-(2,2,1)-hept - 2 - yl]-N',N'-dimethyl-urea having the formula:

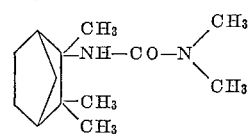

9. Method according to claim 1 wherein said urea is N-[(2-methyl-bicyclo-[2,2,1]-hept - 2-yl)-methyl]-N-methyl-N',N'-dimethyl-urea having the formula:

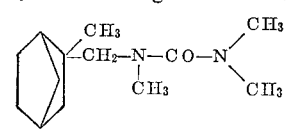

10. Method according to claim 1 wherein said urea is N-[2-(chloro-bicyclo-[2,2,1]-hept - 2 - yl)-eth - 1 - yl]-N',N'-dimethyl-urea having the formula:

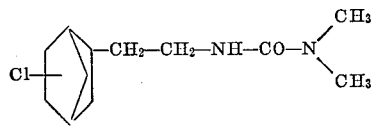

11. Method of repelling arthropods which comprises applying to at least one of (a) such arthropods and (b) their habitat, an arthropod repellant effective amount of a bicyclic-substituted urea having the formula:

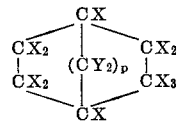

in which one of the symbols X represents the radical:

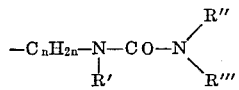

$n$ is a number from 0 to 2, $R'$ is selected from the group consisting of hydrogen and alkyl having 1 to 4 carbon atoms, $R''$ is selected from the group consisting of hydrogen, alkyl having 1 to 4 carbon atoms, and alkoxy having 1 to 3 carbon atoms, and $R'''$ is alkyl having 1 to 4 carbon atoms, and $p$ is a number from 1 to 2, with the proviso that where $p$ is 1 then the remaining 9 symbols X and the 2 symbols Y, each respectively, represents a member selected from the group consisting of hydrogen, chlorine, and methyl, with at least 8 and at most 11 of said remaining 9 symbols X and 2 symbols Y being hydrogen, and that where $p$ is 2, then the remaining 9 symbols X and the 4 symbols Y, each respectively, represents a member selected from the group consisting of hydrogen, chlorine, and methyl, with at least 11 and at most 13 of said remaining 9 symbols X and the 4 symbols Y being hydrogen.

12. Method according to claim 11 wherein said urea is used in the form of a mixture with a dispersible carrier vehicle, said urea being present in an amount substantially between about 1 and 80% by weight of the mixture.

13. Method according to claim 11 wherein said urea is N-[bicyclo-(2,2,1)-hept-2-yl]urea having the formula:

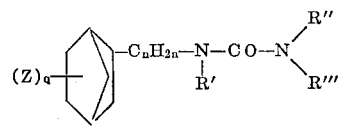

in which $n$ is a number from 0 to 2, $R'$ is selected from the group consisting of hydrogen and alkyl having 1 to 4 carbon atoms, $R''$ is selected from the group consisting of hydrogen, alkyl having 1 to 4 carbon atoms, and alkoxy having 1 to 3 carbon atoms, and $R'''$ is alkyl having 1 to 4 carbon atoms, Z is selected from the group consisting of chlorine and methyl, and $q$ is a number from 0 to 3.

14. Method according to claim 11 wherein said urea is a member selected from the group consisting of at least one of:

N-[1,7,7-trimethyl-bicyclo-(2,2,1)-hept-2-yl]-N',N'-dimethyl-urea-isobornyl isomer;

N-[1,7,7-trimethyl-bicyclo(2,2,1)-hept-2-yl]N',N'-dimethyl-urea-bornyl isomer;

N-[(2-methyl-bicyclo-[2,2,1]-hept-2-yl)-methyl]-N',N'-dimethyl-urea;

N-[(bicyclo-[2,2,1]-hept-2-yl)-methyl]-N'-ethoxy-N'-ethyl-urea;

N-[(bicyclo-[2,2,1]-hept-2-yl)-methyl]-N'-methoxy-N'-methyl-urea;

N-[2,3,3-trimethyl-bicyclo-(2,2,1)-hept-2-yl]-N',N'-dimethyl-urea;

N-[(2-methyl-bicyclo-[2,2,1]-hept-2-yl)-methyl]-N-methyl-N',N'-dimethyl-urea; and N-[2-(chloro-bicyclo-[2,2,1]-hept-2-yl)-eth-1-yl]-N',N'-dimethyl-urea.

15. Method according to claim 11 wherein said urea is N-[1,7,7-trimethyl-bicyclo-(2,2,1)-hept - 2 - yl]-N',N'-dimethyl-urea-bornyl isomer.

References Cited

UNITED STATES PATENTS 3,006,954   10/1961   Ramey et al.

OTHER REFERENCES

Chem. Abstracts, vol. 55, p. 17539e (1961).

ALBERT T. MEYERS, Primary Examiner

V. D. TURNER, Assistant Examiner

UNITED STATES PATENT OFFICE
CERTIFICATE OF CORRECTION

Patent No. 3,534,141 - Dated October 13, 1970

Inventor(s) Gerhard Muller et al.

It is certified that error appears in the above-identified patent and that said Letters Patent are hereby corrected as shown below:

Columns 7 and 8, in the Table, formula compound XVa' should appear as shown below:

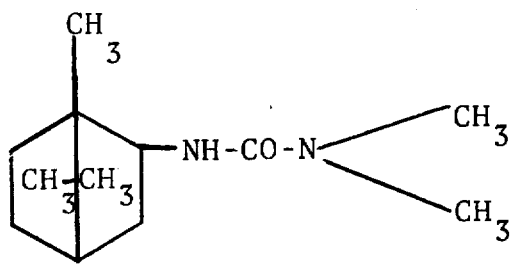

Signed and sealed this 27th day of April 1971.

(SEAL)
Attest:

EDWARD M. FLETCHER, JR.
Attesting Officer

WILLIAM E. SCHUYLER, JR.
Commissioner of Patents